United States Patent
Nyyssölä

(10) Patent No.: US 10,724,966 B2
(45) Date of Patent: Jul. 28, 2020

(54) SENSOR ARRANGEMENT, MEASURING DEVICE AND MEASURING METHOD

(71) Applicant: PKC Wiring Systems Oy, Kempele (FI)

(72) Inventor: Jari Nyyssölä, Kempele (FI)

(73) Assignee: PKC Wiring Systems Oy, Kempele (FI)

( * ) Notice: Subject to any disclaimer, the term of this patent is extended or adjusted under 35 U.S.C. 154(b) by 540 days.

(21) Appl. No.: 15/317,209

(22) PCT Filed: Jun. 8, 2015

(86) PCT No.: PCT/FI2015/050391
§ 371 (c)(1),
(2) Date: Dec. 8, 2016

(87) PCT Pub. No.: WO2015/189466
PCT Pub. Date: Dec. 17, 2015

(65) Prior Publication Data

US 2017/0102341 A1    Apr. 13, 2017

(30) Foreign Application Priority Data

Jun. 11, 2014 (FI) ................................... 20145536

(51) Int. Cl.
*G01N 21/00* (2006.01)
*G01N 21/952* (2006.01)
(Continued)

(52) U.S. Cl.
CPC .......... *G01N 21/952* (2013.01); *G01B 11/24* (2013.01); *G01C 3/08* (2013.01); *H01R 43/0488* (2013.01); *G01N 2201/12* (2013.01)

(58) Field of Classification Search
CPC ................................................... G01B 11/04
(Continued)

(56) References Cited

U.S. PATENT DOCUMENTS 5,546,188 A * 8/1996 Wangler .............. A01M 7/0089
356/398
6,038,027 A   3/2000 Marcus et al.
(Continued)

FOREIGN PATENT DOCUMENTS

CN      102474061 A    5/2012
EP       0667658 A2    8/1995
(Continued)

OTHER PUBLICATIONS

English language abstract for KR20100110223A extracted from espacenet.com database on Jan. 17, 2019, 1 page.
(Continued)

*Primary Examiner* — James R Hulka
(74) *Attorney, Agent, or Firm* — Howard & Howard Attorneys PLLC

(57) ABSTRACT

Measuring equipment for a crimp connection comprises a signal processing unit (150), a ranging sensor arrangement (100) based on using optical radiation, and a moving mechanism (102) that moves a formed crimp connection (104) and the ranging sensor arrangement (100) in relation to each other. The ranging sensor arrangement (100) measures the distance between the ranging sensor arrangement (100) and crimp connection (104) while the ranging sensor arrangement (100) and moving mechanism (102) are moved in relation to each other. The signal processing unit (150) generates surface profile data on the basis of the measured distances, uses the surface profile data of the crimp connection (104) to determine the quality of the crimp connection (104), and displays data related to the crimp connection (104).

12 Claims, 6 Drawing Sheets

(51) Int. Cl.
*H01R 43/048* (2006.01)
*G01B 11/24* (2006.01)
*G01C 3/08* (2006.01)

(58) Field of Classification Search
USPC .............................................. 356/3.01–5.15
See application file for complete search history.

(56) References Cited

U.S. PATENT DOCUMENTS

| | | | |
|---|---|---|---|
| 7,794,292 | B2 | 9/2010 | Viviroli |
| 8,294,809 | B2 * | 10/2012 | Stettner .................. G01B 11/00 348/348 |
| 8,819,925 | B2 | 9/2014 | Onuma et al. |
| 10,229,301 | B2 * | 3/2019 | Cumoli .............. G06K 7/10722 |
| 2007/0218749 | A1 | 9/2007 | Viviroli |
| 2012/0263344 | A1 | 10/2012 | Viviroli |
| 2013/0229644 | A1 * | 9/2013 | Chung .................... G01S 17/88 356/5.01 |
| 2013/0274910 | A1 | 10/2013 | Weingarten et al. |
| 2013/0305835 | A1 | 11/2013 | Jansky et al. |
| 2014/0041200 | A1 | 2/2014 | Hofmeister |

FOREIGN PATENT DOCUMENTS

| | | |
|---|---|---|
| JP | S60170744 A | 9/1985 |
| JP | S61133844 A | 6/1986 |
| JP | 2000131025 A | 5/2000 |
| JP | 2003207318 A | 7/2003 |
| JP | 2006153602 A | 6/2006 |
| JP | 2011107024 A | 6/2011 |
| JP | 2012216491 A | 11/2012 |
| JP | 2013232342 A | 11/2013 |
| KR | 20100110223 A | 10/2010 |
| KR | 20120010710 A | 2/2012 |
| KR | 20140138359 A | 12/2014 |
| WO | 2013043329 A1 | 3/2013 |
| WO | 2014023879 A1 | 2/2014 |

OTHER PUBLICATIONS

English language abstract for KR20120010710A extracted from espacenet.com database on Jan. 17, 2019, 1 page.
English language abstract for KR20140138359A extracted from espacenet.com database on Jan. 17, 2019, 2 pages.
English language abstract for CN102474061A extracted from espacenet.com database on Nov. 28, 2018, 1 page.
Supplementary European Search Report for Application EP 15 80 6413 dated Dec. 20, 2017, 2 pages.
English language abstract for JPS61133844A extracted from espacenet.com database on Mar. 10, 2018, 1 page.
English language abstract for JP2000131025A extracted from espacenet.com database on Mar. 10, 2018, 1 page.
English language abstract for JP2003207318A extracted from espacenet.com database on Mar. 10, 2018, 1 page.
English language abstract for JP2006153602A extracted from espacenet.com database on Mar. 10, 2018, 1 page.
English language abstract for JP2012216491A extracted from espacenet.com database on Mar. 10, 2018, 1 page.
PCT International Search Report dated Sep. 14, 2015 for International Application No. PCT/FI2015/050391.
PCT Written Opinion of the International Searching Authority dated Sep. 14, 2015 for International Application No. PCT/FI2015/050391.
English language abstract for JP2011107024A extracted from espacenet.com database on Sep. 17, 2018, 1 page.
English language abstract for JP2013232342A extracted from espacenet.com database on Sep. 17, 2018, 1 page.
Finnish Search Report for Application FI 20145536 dated Jan. 13, 2015, 2 pages.

\* cited by examiner

SENSOR ARRANGEMENT, MEASURING DEVICE AND MEASURING METHOD

The subject patent application claims priority to and all the benefits of International Application No. PCT/FI2015/050391 filed on Jun. 8, 2015 with the World Intellectual Property Organization, which claims priority to Finish Application No. 20145536 filed on Jun. 11, 2014, the disclosure(s) of which is/are hereby incorporated by reference.

FIELD

The invention relates to a sensor arrangement, measuring device, and measuring method.

BACKGROUND

Crimp connectors may be attached to the ends of electric conductors. It is important to be able to measure the quality of the crimp connection so as to ensure the electrical conductivity and mechanical strength of the connection as well as a sufficiently uniform quality, among other things.

The quality of a connection is measured manually by using a mechanical measuring tool. The measuring can be performed with a slide gauge or micrometer screw, for instance. In such a case, the outer dimensions of the connector are measured to find out, whether the connector has been crimped too much, sufficiently, or too little. It is also possible to determine, whether the connector is of a correct shape.

The quality of a connection can also be measured in a destructive manner. Destructive measurements include cross-section measurement and tensile measurement. In cross-section measurement, the connector is physically cut in half in the transverse direction, the dimensions, shape and conductor locations, etc., are measured from the cross-section or its image. In tensile measurement, the conductor is pulled off the connection and the force required to separate it is measured. This shows, whether the connection was mechanically all right.

Mechanical measurement is slow and imprecise, and the measurer affects the result. Destructive measurements literally break the connection and the measured connection is no longer usable. When using destructive measurement, specifically the unmeasured connections will be used in the final product, which means that their quality cannot be ensured by measurement. Therefore, there is a need to further develop the measuring of crimp connections of conductors.

BRIEF DESCRIPTION

The object of the invention is to provide an improved solution. This is achieved by a sensor arrangement in accordance with claim 1.

The invention also relates to measuring equipment for a crimp connection in accordance with claim 6.

The invention further relates to a measuring method in accordance with claim 11.

Preferred embodiments of the invention are disclosed in the dependent claims.

The apparatus and method according to the invention provide several advantages. A crimp connection can be measured manually or automatically without touching the crimp connection with the measuring device. In addition, the crimp connection can be measured without breaking the crimp connection for or during the measurement.

LIST OF FIGURES

The invention will now be described in greater detail in connection with preferred embodiments and with reference to the accompanying drawings, in which FIG. 1 shows an example of a sensor arrangement;

DESCRIPTION OF EMBODIMENTS

The following embodiments are presented by way of example. Even though the description may refer to "an" embodiment or embodiments at different points, this does not necessarily mean that each such reference refers to the same embodiment or embodiments or that the feature only applies to one embodiment. Individual features of different embodiments may also be combined to make other embodiments possible.

Figure 1:
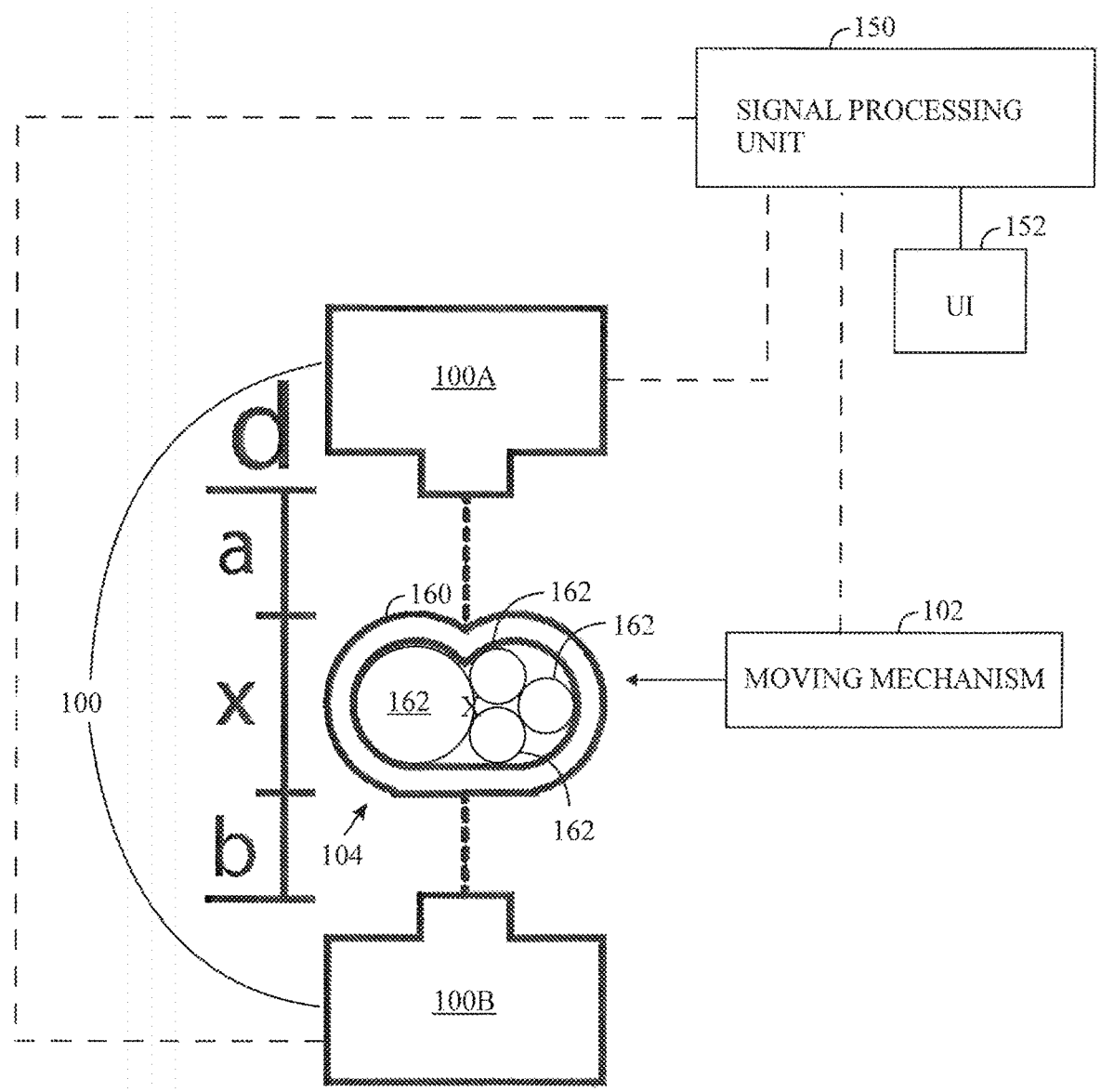

FIG. 1 shows a schematic example of a sensor arrangement for measuring a crimp connection. The sensor arrangement comprises a ranging sensor arrangement 100 based on using optical radiation, and a moving mechanism 102 that moves the crimp connection 104 formed by crimping in relation to the ranging sensor arrangement 100. In FIG. 1, the ranging sensor arrangement 100 comprises two ranging sensors 100A and 100B, but generally there may be one or more ranging sensors. The ranging sensor 100A may be a single measuring unit which comprises typically two laser sensors, for example. The ranging sensor 100B may correspondingly be a single measuring unit which comprises typically two laser sensors, for example.

The crimp connection 104 comprises a connector 160 and at least one conductor 162 each of which may also be called a wire. The at least one conductor 162 may, in turn, comprise one or more strands. The number and arrangement of the conductors 162 in the crimp connector 162 may vary freely. The connector 160 may be made of metal. The one or more conductors may also be made of metal or some other electrically conductive material. The metal of the at least one conductor 162 may comprise at least one of the following, for example: copper, silver, and gold, without being restricted to these. In this patent application, optical radiation, in turn, refers to an electromagnetic radiation wavelength range of approximately 10 nm to 500 μm. In an embodiment, ultraviolet light, visible light, and/or infrared light are used. In an embodiment, visible light and/or near infrared light are used.

The ranging sensor arrangement 100 measures the distance between the ranging sensor arrangement 100 and crimp connection 104. The operation of the ranging sensor arrangement 100 may in an embodiment be based on the triangulation principle. The ranging sensor arrangement 100 may comprise sensors OD5-30T05 in the OD Precision series made by SICK. The controller of the sensors may be controller AOD5-PI of SICK, for instance. In optical triangulation, an optical transmitter transmits a narrow light beam that forms a lighted point on the surface of the object being measured. The direction of the light beam may be changed, in which case the lighted point forms at different points on the surface being measured. From the different points of the surface being measured, the light is reflected and hits in point-form different points on the surface being detected, which may comprise a pixel matrix. The pixel matrix may, in turn, be a semi-conductor component. The location of the lighted point on the surface being detected defines, together with the distance between the optical transmitter and the surface being detected and the direction of the optical beam, the distance of the surface being measured in relation to the optical transmitter and/or surface being detected. This type of measuring principle is known per se. The measuring precision of industrially used devices is very good with an imprecision of even less than 1 μm. Often an imprecision of approximately 1/100 mm or only 1/10 mm, for example, is sufficient.

The optical triangulation principle is often used on objects at a distance of at most one meter and, therefore, the measuring principle is well suited for measuring crimp connections, because crimp connections are often in the size range of millimeters, centimeters or at most tens of centimeters. However, the present solution is not restricted to optical triangulation, and other optical measuring principles can also be utilized. Examples of other known optical measuring principles are propagation time measurement and phase difference measurement.

In an embodiment, the moving mechanism 102 may for instance comprise an electric motor and a possible transmission mechanism moved by the electric motor.

Thus, the ranging sensor arrangement 100 may operate like a laser scanner, with which coordinate values for each point in even a large number of points can be measured from the object being measured in three different dimensions, i.e., x, y, and z coordinates. Usually, there are a lot of measured points, from tens to millions, for example, which makes it possible to form a surface profile for the object being measured. The laser scanner or the like may scan over the crimp connection 104 for forming information about a line-like contour of a cross-section of a crimp connection 104 or a conductor 162. In an embodiment, only one scan may be required.

Instead of an actual laser, the source for the optical radiation may be an LED or even an ordinary lamp.

The ranging of several points on the surface of a crimp connection 104 may be performed by moving the crimp connection 104 relative to the ranging sensor arrangement 100. Measuring several locations in the crimp connection 104 requires that the movement of the crimp connection 104 with respect to the ranging sensor 100 comprise a component to a direction differing from the normal of one location of the crimp connection 104 surface. In other words, just distancing the ranging sensor arrangement 100 and crimp connection 104 from each other and/or bringing them closer to each other only allows for the measurement of one point at different distances. When the crimp connection 104 moves with respect to the ranging sensor arrangement 100 which directs the ranging to different points of the crimp connection 104 surface, the distance of different points of the crimp connection 104 surface can be measured in relation to the ranging sensor arrangement 100. The measured distance data can be used for determining the quality of the crimp connection 104. The quality may refer to measurable physical properties.

In an embodiment, the moving mechanism 102 may rotate the crimp connection 104 at least partly with respect to the ranging sensor arrangement 100. In an embodiment, the rotation center X may be inside the crimp connection 104. In an embodiment, the rotation center may be between the crimp connection 104 and the ranging sensor arrangement 100. In an embodiment, the rotation center is not between the crimp connection 104 and the ranging sensor arrangement 100 or inside the crimp connection 104, in other words, the rotation center is at another location than between the crimp connection 104 and the ranging sensor arrangement 100 or inside the crimp connection 104.

In an embodiment, the moving mechanism 102 may rotate the crimp connection 104 in relation to the ranging sensor arrangement 100 during measuring. The rotation center X may then be inside the crimp connection 104.

In an embodiment, the moving mechanism 102 may move the crimp connection 104 in the direction of the longitudinal axis of the conductor 162 during the measuring process that comprises several measuring events. One measuring event refers to measurement performed for forming a ranging result for one measuring point.

In an embodiment, the ranging event of each measuring point may be performed during the movement of the crimp connection 104.

In an embodiment, the ranging can be performed by stopping the movement of the crimp connection 104 at each measuring point so as to perform the ranging event, and then moving to the next measuring point by means of the movement of the crimp connection 104 so as to measure its distance.

In an embodiment, shown by FIG. 1, the ranging sensor arrangement 100 comprises at least two ranging sensors 100A, 100B, each 100A/100B being arranged to measure a plurality of measuring points of the crimp connection 104 from different directions in relation to one or more other ranging sensors 100B/100A.

In an embodiment, the measuring equipment comprises the measuring sensor arrangement 100, the moving mechanism 102, and a signal processing unit 150. The signal processing unit 150 receives the measured distances from the sensors 100A, 100B through a wired or wireless connection and generates surface profile data on the basis of the measured distances and uses the surface profile data of the crimp connection 104 to determine the quality of the crimp connection 104, and displays data related to the crimp connection 104 on a user interface 152 connected to it. The quality may mean a dimension of the crimp connection 104 and a shape of the crimp connection 104.

In an embodiment, the signal processing unit 150 finds the narrowest point of the crimp connection 104 on the basis of the ranging data and uses it as basis for quality assessment data for the crimp connection 104. The quality may mean a dimension of the crimp connection 104 and a shape of the crimp connection 104. The narrowest point relates to how much the crimp connector 160 and one or more conductors 162 have been crimped. The narrowest point refers to the smallest diameter D of the crimp connection 104 (see FIG. 7). This reveals, whether the crimp connection 104 is of a correct or suitable size/shape.

In an embodiment, the signal processing unit 150 finds the highest point of the crimp connection 104 on the basis of the ranging data from the ranging sensors 100A, 100B and uses it as basis for quality assessment data for the crimp connection 104. The highest point relates to how much the crimp connector 160 and one or more conductors 162 have been crimped. The highest point can be detected in such a manner that the distance to the highest point is the smallest. The highest point refers to the largest diameter Dmax of the crimp connection 104. This reveals, whether the crimp connection 104 is of a correct or suitable size/shape. Thus, it is possible to find in the measurement at least one point that has at least one of the following properties: the diameter of the crimp connection is the largest and the diameter of the crimp connection is the smallest.

If both the crimp connector 160 and one or more conductors 162 used in the connection have been of a correct size, it may be that the crimping force has been too high or low, which is why the crimp connection 104 is not of a correct or suitable size/shape. On the other hand, the used crimping force may be correct or suitable, but the crimp connector 160 and/or one or more conductors 162 used in the connection may be unsuitable or incorrect. This, too, shows as a deviation of the size and/or shape of the crimp connection 104 from the correct or suitable.

In an embodiment, the signal processing device 150 defines the shape of the surface profile of the crimp connection 104 and uses said shape of the surface profile of the crimp connection 104 as basis for quality assessment data for the crimp connection 104.

Figure 2:
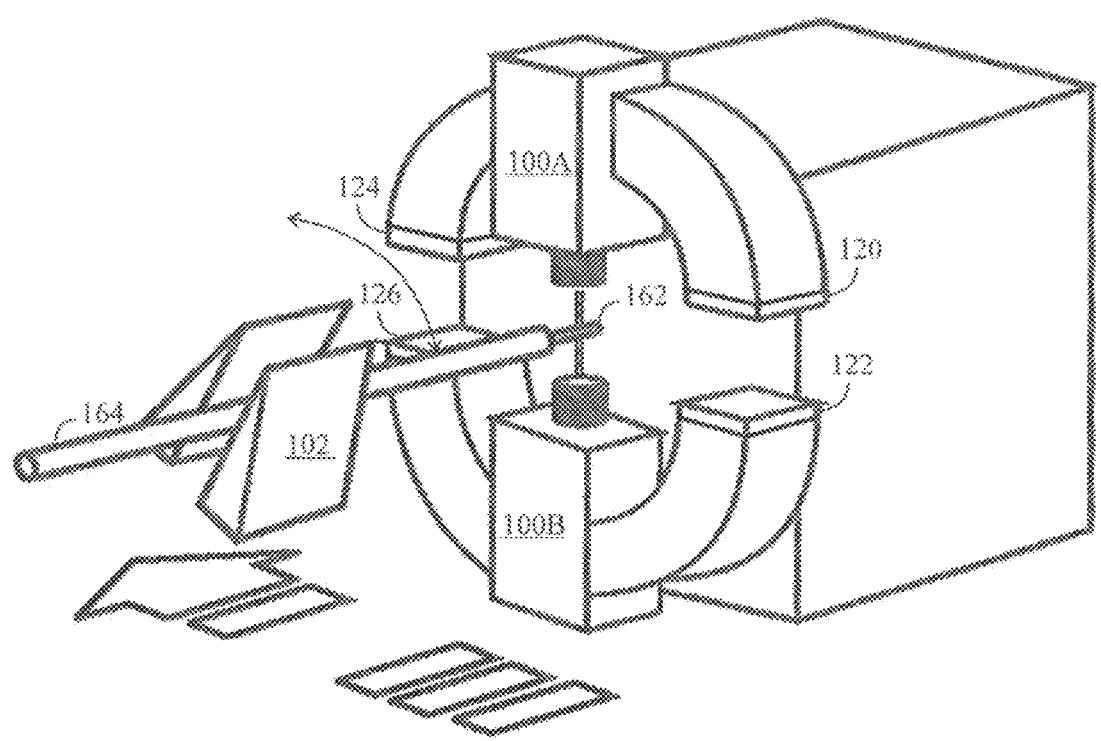
FIG. 2 shows an example of measuring the end of a conductor.

FIG. 2 shows an embodiment, in which the ranging sensor arrangement 100 measures the distance between the ranging sensors 100A, 100B and conductor 162 by moving the moving mechanism 102 in relation to the ranging sensor arrangement 100 in the same manner as in connection with the measurement of the crimp connection. This is done before the formed crimp connection 104. The conductor 162 may be covered with an electrically insulating material 164. The insulating material 164 may be polymer such as plastic or rubber, for example. The insulating material 164 may be peeled from the end of the conductor 162 before connection as also explained in association with FIG. 4. Then, as shown in FIG. 1, signal processing unit 150 uses the measuring data related to the conductor 162 together with the measuring data related to the surface profile of the crimp connection 104 for the determination of the quality of the crimp connection 104. A schematic of the moving mechanism 102 for moving the conductor 162 is shown with the wedge-like structures in FIGS. 2 and 3.

In an embodiment as shown in FIG. 2, the measuring equipment may comprise sensor units 120 and 124. When the conductor 162 is moved towards the measurement with the ranging sensors 100A, 100B, the conductor 162 first passes the first sensor unit 120. The sensor unit 120 then detects the conductor 162, and the detection is a signal that the measurement with the ranging sensors 100A, 100B may be performed. That is, the signal processing unit 150 receives the signal and controls the ranging sensors 100A, 100B to start the distance measurements. As the moving conductor 162 passes the second sensor element 124, the detection with the second sensor element 124 is a signal for stopping the measurement with the ranging sensors 100A, 100B. That is, the signal processing unit 150 receives the signal from the second sensor element 124 and controls the ranging sensors 100A, 100B to stop the distance measurements. Instead of sensor units 120 and 124, the detection for starting and stopping the distance measurement may be performed with sensor units 122 and 126. It is also possible to perform the detection for starting and stopping the distance measurement with sensor units 120 and 126 or with sensor units 122 and 124.

In another embodiment, when the conductor 162 is moved towards the measurement with the ranging sensors 100A, 100B, the conductor 162 first passes through a gap between the first sensor elements 120, 122. The first sensor elements 120, 122 then detect the conductor 162, and the detection is a signal that the measurement with the ranging sensors 100A, 100B may be performed. As the moving conductor 162 passes through the second sensor elements 124, 126, the detection with the second sensor elements 124, 126 is a signal for stopping the measurement with the ranging sensors 100A, 100B. The detection performed by the first and second sensor elements 120, 122 and 124, 126 may be based optical measurement, for example. The sensor elements 120, 122 may comprise a photoelectric slot sensor or the like. In a similar manner, the sensor elements 124, 126 may comprise a photoelectric slot sensor or the like. The photoelectric slot sensor may be such as SRF-30, SRF50, SRF-80 or SRF-120 made by Datalogic.

Generally, each conductor has its own crimp connector 160. Each conductor or all conductors then have predefined crimp connection profile information that may be stored in advance in the memory of the signal processing unit 150, or the signal processing unit 150 may retrieve the information over a data network from a server. When the conductor 162 or conductors 162 are first measured, the conductor 162 or conductors 162 show, which crimp connector 160 should be used for said one or more conductors 162. In addition, the signal processing unit 150 may have in its memory the intended crimp connection profile information for said conductor 162. Then, if an unusual or incorrect crimp connector 104 is used in the crimp connection of the measured at least one conductor 162 and if the crimp connection appears good as such or visually meets the predefined regulations, the measuring device may warn about the quality of the crimp connection, because, according to measurements, the crimp connection is after all not suitable for said one or more conductors 162. An incorrect or unusual conductor 162 is namely of a different size than a correct or suitable conductor.

Correspondingly, if the conductor 162 is correct or suitable or all conductors 162 are correct or suitable, but the crimp connector 160 is unusual, unsuitable or incorrect, the measuring device may warn about the quality of the crimp connection on the basis of the measurements of one or more conductors 162 and crimp connection 104, because, according to the measurements, the crimp connection is not suitable for the conductor or conductors 162.

Figure 3:
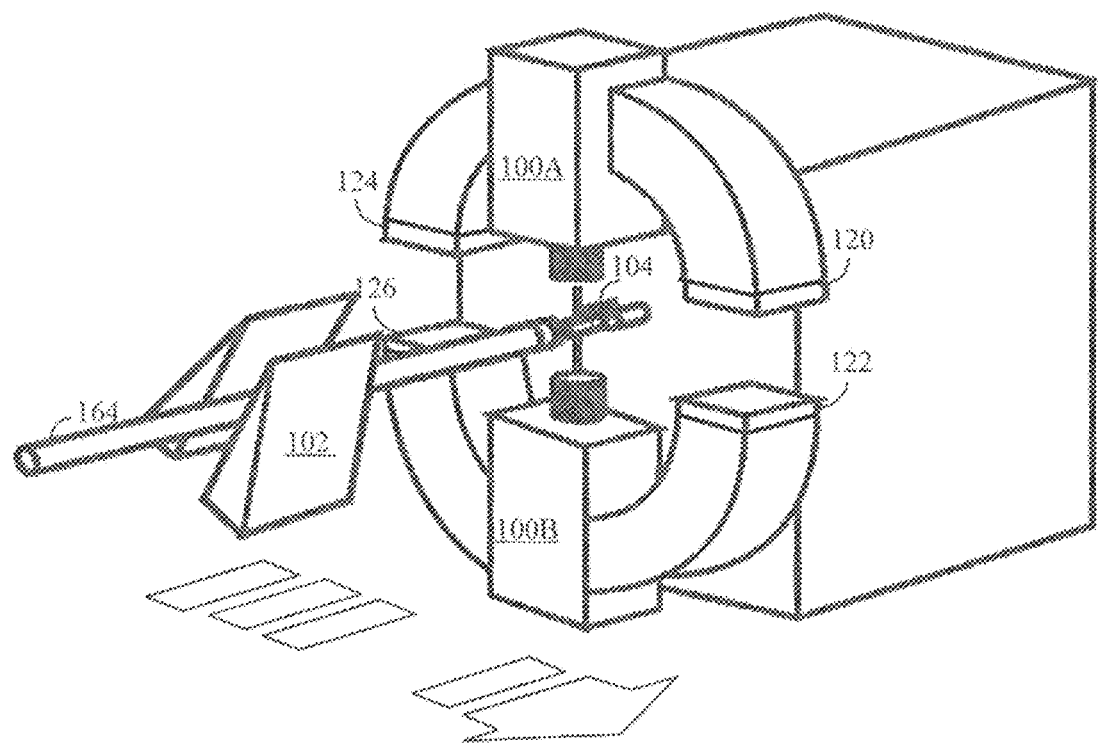
FIG. 3 shows an example of measuring an uncrimped crimp connector.

FIG. 3 shows a schematic example of an embodiment, in which the ranging sensor arrangement 100 (shown in FIG. 1) measures the distance between the ranging sensors 100A, 100B and a crimp connection 104N uncrimped with a crimping device 402, 404 (shown in FIG. 4) while the moving mechanism 102 is moved in relation to the ranging sensor arrangement 100. When the ranging according to FIG. 1, in which the distance between the ranging sensor arrangement 100 and crimp connection 104 crimped with the crimping device 402, 404 is measured while the moving mechanism 102 is moved in relation to ranging sensor arrangement 100, has also been done, the signal processing unit 150 may use the measuring data related to the surface profile of the uncrimped crimp connection 104N and crimped crimp connection 104 to determine the quality of the crimp connection 104 crimped with the crimping device 402, 404.

In an embodiment as shown in FIG. 3, the measuring equipment may comprise sensor units 120 and 124 which are also shown in FIG. 2. When the crimp connection crimped (104) or uncrimped (104N) and is moved towards the measurement with the ranging sensors 100A, 100B, the crimp connection 104N, 104 first passes the first sensor unit 120. The sensor unit 120 then detects the crimp connection 104N, 104, and the detection is a signal that the measurement with the ranging sensors 100A, 100B may be performed. That is, the signal processing unit 150 receives the signal and controls the ranging sensors 100A, 100B to start the distance measurements. As the moving crimp connection 104N, 104 passes the second sensor element 124, the detection with the second sensor element 124 is a signal for stopping the measurement with the ranging sensors 100A, 100B. That is, the signal processing unit 150 receives the signal from the second sensor element 124 and controls the ranging sensors 100A, 100B to stop the distance measurements. Instead of sensor units 120 and 124, the detection for starting and stopping the distance measurement may be performed with sensor units 122 and 126. It is also possible to perform the detection for starting and stopping the distance measurement with sensor units 120 and 126 or with sensor units 122 and 124.

In another embodiment, when the crimp connection 104N, 104 is moved towards the measurement with the ranging sensors 100A, 100B, the crimp connection 104N, 104 first passes through a gap between the first sensor elements 120, 122. The first sensor elements 120, 122 then detect the crimp connection 104N, 104, and the detection is a signal that the measurement with the ranging sensors 100A, 100B may be performed. As the moving crimp connection 104N, 104 passes through the second sensor elements 124, 126, the detection with the second sensor elements 124, 126 is a signal for stopping the measurement with the ranging sensors 100A, 100B. The detection performed by the first and second sensor elements 120, 122 and 124, 126 may be based optical measurement, for example. The sensor elements 120, 122 may comprise a photoelectric slot sensor or the like. In a similar manner, the sensor elements 124, 126 may comprise a photoelectric slot sensor or the like. The photoelectric slot sensor may be such as SRF-30, SRF-50, SRF-80 or SRF-120 made by Datalogic.

Figure 4:
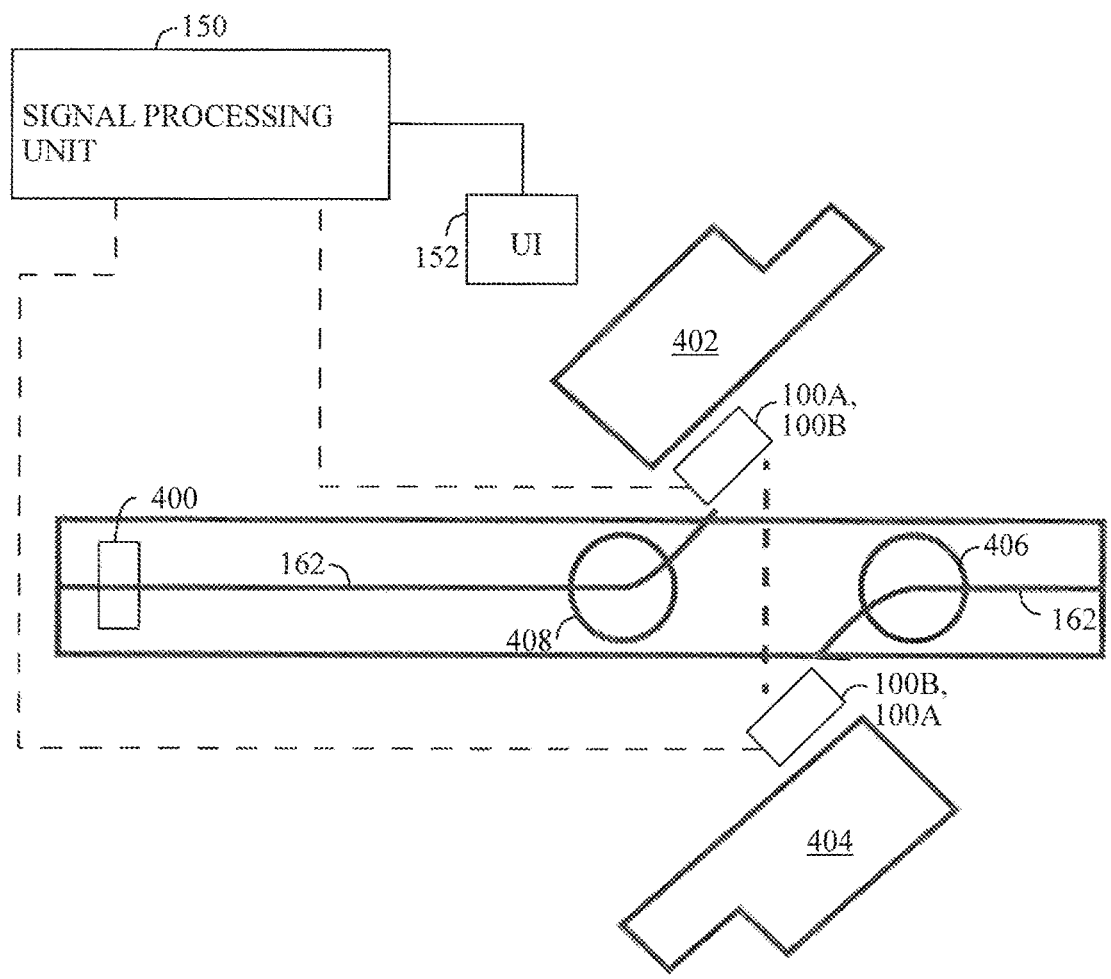
FIG. 4 shows an example of making two crimp connections at the same time.

FIG. 4 shows a schematic example of crimp connection equipment that comprises a conductor cutter 400, two crimping devices 402, 404, two ranging sensors 100A, 100B, turning mechanisms 406, 408 for the conductor 162, and a signal processing unit 150. In addition, the crimp connection equipment may move the conductors 162 in the longitudinal direction of the conductors 162 and possibly peel the ends of the conductors 162 for the connection, but these parts are not described in more detail in this patent application, because they are not essential for the present solution. After the conductor 162 has been cut, the turning mechanisms 406, 408 of the conductors 162 turn the end of the conductor 162 to the crimping devices 402, 404. Next, a crimp connector can be mounted on both of the cut ends of the conductors 162 by means of the crimping devices 402, 404. The quality of the crimp connection at the ends of both conductors 162 can be measured with the ranging sensors 100A, 100B. In addition, it is possible to measure the ends of the conductors 162 with the ranging sensors 100A, 100B before making the crimp connection. Quality refers to a predetermined shape or dimension of the crimp connection 104. The compression of the crimp connection 104 may minimize the amount of air in the crimp connection 104. The predetermined shape or dimension of the crimp connection 104 depends on the type of the crimp connection 104. As already earlier explained, the signal processing unit 150 generates surface profile data on the basis of the measured distances and uses the surface profile data of the crimp connection 104 to determine the quality of the crimp connection 104, and displays data related to the crimp connection 104 on the user interface 152 connected to it.

Figure 5A:
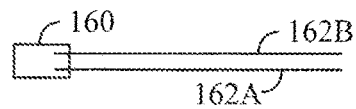
FIG. 5A shows an example of a crimp connection between two conductors.

FIG. 5A shows a schematic example of an embodiment, in which, instead of mounting a crimp connector 160 to the end of the conductor, two conductors 162A, 162B can be connected at their ends with the crimp connector 160. The multiple conductors 162A, 162B may go into the crimp connector 160 from the same side of the crimp connector 160. The conductors 162A, 162B are shown inside the crimp connector 160. The ends of the conductors 162 are brought inside the crimp connector 160 and the crimp connector 160 with its conductors 162 is crimped with the crimping device 402, 404. This produces a long conductor, the crimp connection 104 of which can be checked with the measuring method described above.

Figure 5B:
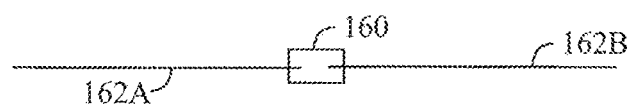
FIG. 5B shows another example of a crimp connection between two conductors.

FIG. 5B shows a schematic example of an embodiment, in which the multiple conductors 162A, 162B may go into the crimp connector 160 from the opposite side of the crimp connector 160. into the crimp connector 160 from the same side of the crimp connector 160. The conductors 162A, 162B are shown inside the crimp connector 160.

Figure 6:
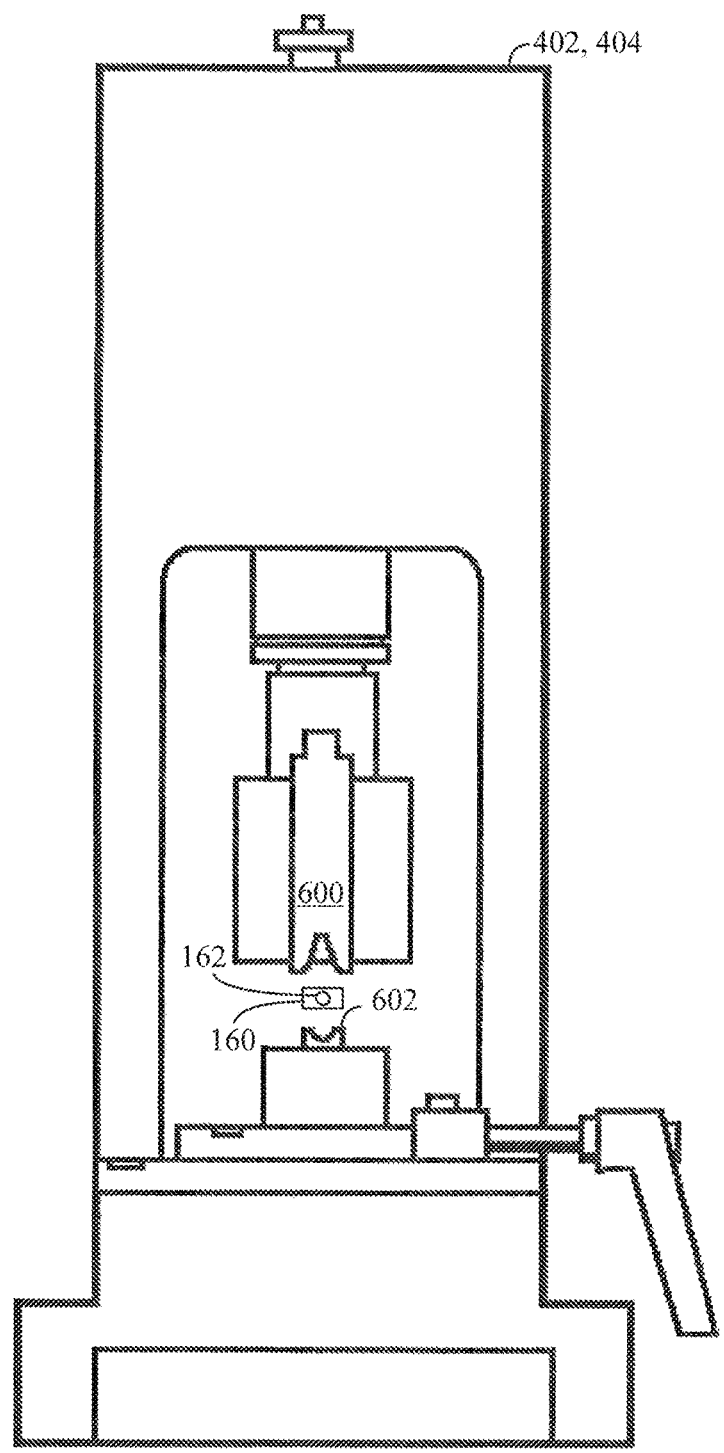
FIG. 6 shows an example of a crimping device.

FIG. 6 shows a schematic example of a crimping device. The crimping device 402, 404 may have crimping clamps 600, 602, between which the crimp connector 160 with one or more conductors 162 is crimped. The power source of the crimping device 402, 404 may be based on hydraulics, in which case it is a hydraulic crimping device, on pneumatics, in which case it is a pneumatic crimping device, or on mechanics, in which case a mechanical motor moves the crimping clamps 600, 602 toward each other via a transmission mechanism during the crimping step. The mechanical motor may be an electric motor, for example. When crimping a crimp connector and conductors, the crimp connection must be crimped enough so that no extra air remains in the connection. When the crimp connection is acceptable in tensile strength, thickness, and shape, there is no extra air in the crimp connection. Therefore, if a crimp connection measured with the solution disclosed in this patent application is acceptable, the remaining air therein is also optimized.

Figure 7:
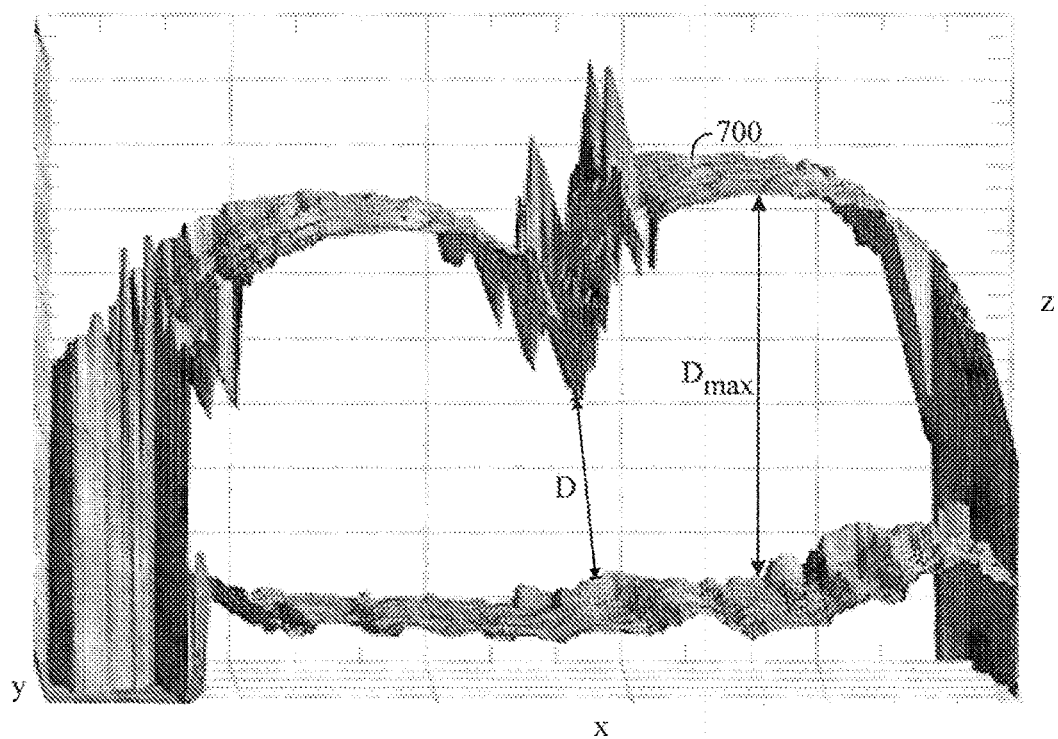
FIG. 7 shows an example of the surface profile of a crimp connection.

FIG. 7 shows a schematic example of a crimp connection surface profile 700 that has been measured with two measuring sensors 100A, 100B on different sides of the crimp connection. The narrowest point and the diameter D of the narrowest point can be determined from the measured surface profile. The highest point and the diameter Dmax of the highest point can be determined from the measured surface profile. The narrowest and highest diameter can be measured parallel to the crimping force, or at least nearly parallel to it, i.e. in this case vertically. The z axis in the vertical direction shows the thickness of the crimp connection, the x axis in the horizontal direction shows the width of the crimp connection, and the y axis in the depth direction of FIG. 7 shows the shape of the surface profile in the longitudinal direction of the connector (and one or more conductors). Quality assessment of a crimp connection based on ranging provides a better result than by measuring from a photograph, for instance, because it is impossible or at least nearly impossible to measure the location of the edge of the crimp connection from a photograph at an imprecision/resolution of 0.001 mm. An imprecision of 1/100 mm or the even more modest 1/10 mm is already difficult to achieve.

Figure 8:
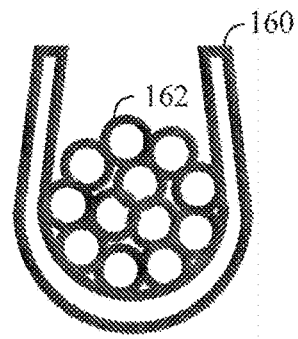
FIG. 8 shows an example of a crimp connector and conductors before crimping.
Figure 9A:
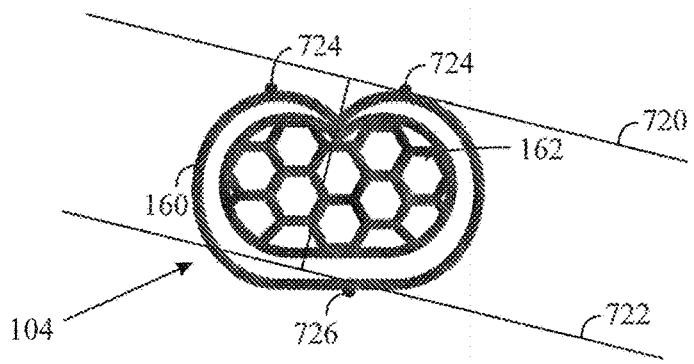
FIG. 9A shows an example of a crimp connector and conductors after crimping.

FIG. 8 shows a schematic example of a cross section of the crimp connector 160 and conductors 162 before crimping. FIG. 9A shows the crimp connector 160 and conductors 162 after crimping. During crimping the crimp connector 160 may be compressed tightly around the conductors 162 and the conductors 162 may be pressed tightly against each other. The FIGS. 8 and 9A show that, after crimping, there may be less air between the conductors 162 and between the conductors 162 and the crimp connector 160 than before crimping. However, the amount of air doesn't necessarily change. In addition, the conductors 162 may deform with the crimp connector 160 under the crimping force. A circular cross section of conductors 162 may be deformed into a shape of resembling more or less a honeycomb under the pressure, for example. A desired crimp connection typically has a minimum seal, all conductors and their potential strands are inside the crimp ears and crimp ears are uniformly formed.

FIG. 9A shows a schematic cross sectional example that the profile of the crimp connection 104 may be in any angle with respect to the ranging sensor arrangement 100. The dimension such as thickness of the crimp connection 104 may be calculated on the basis of a slope of parallel lines 720, 722 the normal of which is directed towards the ranging sensor arrangement 100. The lines 720, 722 may be formed on the basis of regression. The distance between the lines 720, 722 determines the dimension of the crimp connection 104. The lines 720, 722 may be formed on the basis of measurements done on the opposite sides of the crimp connection 100. The signal processing unit 150 may determine the lines 720, 722 such that they are tangents to the surface of the crimp connection 104. The location at which the lines 720, 722 touch the crimp connection 104 in different angles may be based on experience, simulation or theory.

The highest points such as local maximums 724, 726 of the crimp connection 104 may be searched for and a line going through the points 724 may be formed. The shortest distance between the line going through the points 724 and the point 726 may then be determined so as to form a diameter of the crimp connection 104.

Figure 9B:
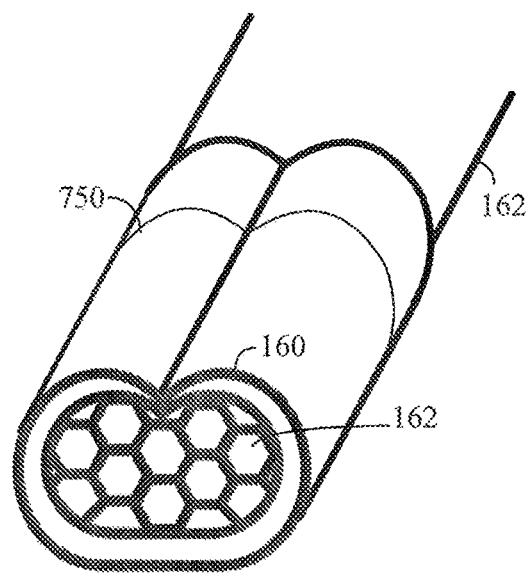
FIG. 9B shows an example of scanning measurement of a crimp connection.

FIG. 9B shows a cross sectional example of scanning measurement. The ranging arrangement 100 may perform one distance measurement scan over the crimp connection 104 in a transverse direction with respect to the longitudinal axis of a conductor 162 of the crimp connection 104. In an embodiment, no more than one scan over the crimp connection 104 is performed. In such an example, the result is a line-like contour 750 of a cross-sectional profile of the crimp connection 104. A similar line-like contour 750 of a cross-sectional profile of a conductor 162 may also be measured before a crimp measurement.

Figure 10:
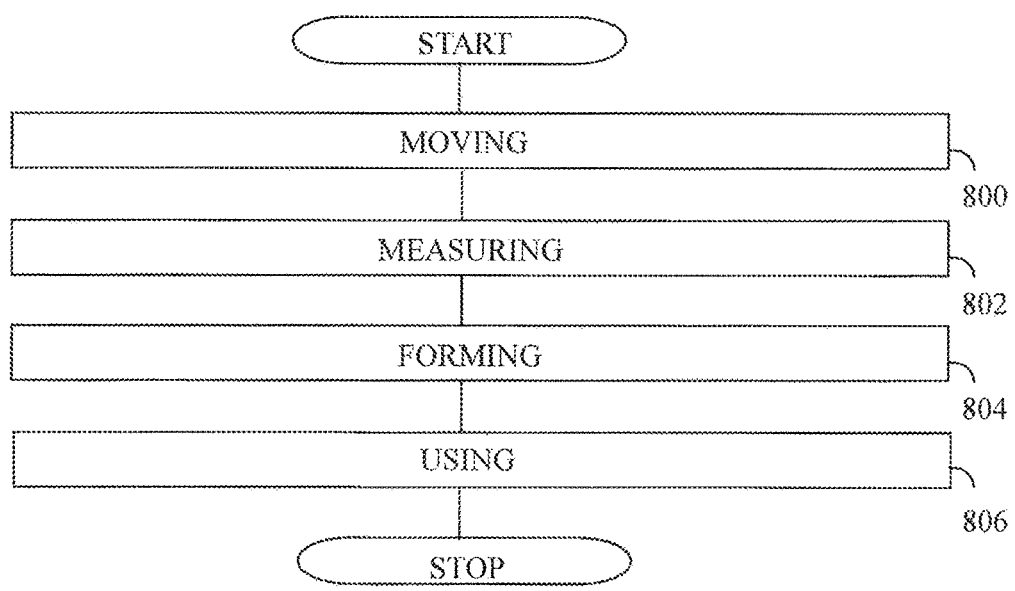
FIG. 10 shows a model flow chart of a measuring method.

FIG. 10 is a flow chart of a regulation method. In step 800, the moving mechanism 102 moves the formed crimp connection 104 and the ranging sensor arrangement 100 in relation to each other. In step 802, the ranging sensor arrangement 100 that is based on using optical radiation measures the distance between different measuring points of the ranging sensor arrangement 100 and the surface of the crimp connection 104 while the ranging sensor arrangement 100 and crimp connection 104 are moved in relation to each other. In step 804, the signal processing unit 150 generates surface profile data on the basis of the measured distances.

In step 806, the surface profile data of the crimp connection 104 is used 806 in the quality assessment of the crimp connection 104.

The method shown in FIG. 10 may be implemented as a logic circuit solution or computer program. The computer program may be placed on a computer program distribution means for the distribution thereof. The computer program distribution means is readable with a data processing device and it may encode the computer program commands to control the operation of the measuring device.

The distribution means, in turn, may be a solution known per se for distributing a computer program, for instance a data processor-readable medium, a program storage medium, a data processor-readable memory, a data processor-readable software distribution package, or a data processor-readable compressed software package. In some cases, the distribution medium may also be a data processor-readable signal, or a data processor-readable telecommunications signal.

Even though the invention has been described above with reference to the examples according to the attached drawings, it is clear that the invention is not restricted thereto but may be modified in many ways within the scope of the accompanying claims.

The invention claimed is:

1. A sensor arrangement for measuring a crimp connection formed between a conductor and a connector, the sensor arrangement comprising:

a ranging sensor arrangement based on using optical radiation comprising at least one ranging sensor, first and second sensor units arranged to detect the conductor and the crimp connection including the conductor, a moving mechanism arranged to move each of the conductor and the crimp connection relative to the ranging sensor arrangement and between the first and second sensor units, the first sensor unit arranged to detect the conductor when the conductor moves past the first sensor unit to provide a signal to start measurement of the conductor with the ranging sensor, and the second sensor unit arranged to detect the conductor when the conductor moves past the second sensor unit to provide a signal to stop measurement of the conductor with the ranging sensor, the first sensor unit arranged to detect the conductor and the connector forming the crimp connection when the crimp connection moves past the first sensor unit to provide a signal to start measurement of the crimp connection with the ranging sensor and the second sensor unit arranged to detect the conductor and the connector forming the crimp connection when the crimp connection moves past the second sensor unit to provide a signal to stop the measurement of the crimp connection with the ranging sensor, the ranging sensor arrangement is arranged to measure distances between the ranging sensor and a plurality of points of the surface of the conductor while the conductor moves in relation to the ranging sensor arrangement, a signal processing unit receiving measured distance data from the ranging sensor and determining at least one of the following properties: a dimension of the conductor and a shape of the conductor, and the ranging sensor arrangement is arranged to measure distances between the ranging sensor and a plurality of points of the surface of the crimp connection while the crimp connection moves in relation to the ranging sensor arrangement, the signal processing unit receiving measured distance data from the ranging sensor and determining at least one of the following properties: a dimension of the crimp connection and a shape of the crimp connection.

2. The sensor arrangement as claimed in claim 1, wherein the ranging sensor is configured to perform one distance measurement scan over the crimp connection in a transverse direction with respect to the longitudinal axis of the conductor of the crimp connection.

3. The sensor arrangement as claimed in claim 1, wherein the moving mechanism is arranged to rotate the crimp connection in relation to the ranging sensor arrangement with a center of rotation located inside the crimp connection.

4. The sensor arrangement as claimed in claim 1, wherein the moving mechanism is arranged to move the crimp connection one-directionally in the direction of the longitudinal axis of the conductor during ranging.

5. The sensor arrangement as claimed in claim 1, wherein the ranging sensor arrangement comprises at least two ranging sensors, each being arranged to measure each measuring point of the crimp connection from different directions in relation to one or more other ranging sensors.

6. The sensor arrangement as claimed in claim 1, wherein the moving mechanism is arranged to rotate the crimp connection in relation to the ranging sensor arrangement with a center of rotation located outside the crimp connection.

7. A measuring equipment for a crimp connection formed between a conductor and connector, the measuring equipment comprising:
   a signal processing unit;
   a ranging sensor arrangement based on using optical radiation comprising at least one ranging sensor,
   first and second sensor units arranged to detect the conductor and the crimp connection including the conductor; and
   a moving mechanism arranged to move each of the conductor and the crimp connection relative to the ranging sensor arrangement and between the first and second sensor units,
   the first sensor unit arranged to detect the conductor when the conductor moves past the first sensor unit to provide a signal to start measurement of the conductor with the ranging sensor, and the second sensor unit arranged to detect the conductor when the conductor moves past the second sensor unit to provide a signal to stop measurement of the conductor with the ranging sensor,
   the first sensor unit arranged to detect the conductor and the connector forming the crimp connection when the crimp connection moves past the first sensor unit to provide a signal to start measurement of the crimp connection with the ranging sensor and the second sensor unit arranged to detect the conductor and the connector forming the crimp connection when the crimp connection moves past the second sensor unit to provide a signal to stop the measurement of the crimp connection with the ranging sensor,
   the ranging sensor arrangement is arranged to measure distances between the ranging sensor and a plurality of points of the surface of the conductor while the conductor moves in relation to the ranging sensor arrangement,
   the ranging sensor arrangement is arranged to measure distances between the ranging sensor and a plurality of points of the surface of the crimp connection while the crimp connection moves in relation to the ranging sensor arrangement,
   the signal processing unit is arranged to generate connection surface profile data on the basis of the measured distances between the ranging sensor and the plurality of points of the surface of the crimp connection, and to use the surface profile data of the crimp connection to determine at least one of the following properties: a dimension of the crimp connection and a shape of the crimp connection, and to display data related to the at least one determined property of the crimp connection, and
   the signal processing unit is arranged to generate conductor surface profile data on the basis of the measured distances between the ranging sensor and the plurality of points of the surface of the conductor, and to use the conductor surface profile data together with the connection surface profile data for determining a quality of the crimp connection.

8. The measuring equipment as claimed in claim 7, wherein the signal processing unit is arranged to find at least one point of the crimp connection, which has at least one of the following properties: the largest diameter of the crimp connection and the smallest diameter of the crimp connection; and to use the properties as basis for quality assessment data for the crimp connection.

9. The measuring equipment as claimed in claim 7, wherein the signal processing unit is arranged to determine the shape of the surface profile of the crimp connection and to use said shape of the surface profile of the crimp connection as basis for quality assessment data for the crimp connection.

10. A measuring method for measuring a crimp connection formed between a conductor and a connector, the method comprising the steps of:
    moving, with a moving mechanism, a conductor between a first sensor unit and a second sensor unit and relative to a ranging sensor arrangement radiation comprising at least one ranging sensor,
    detecting, with the first sensor unit, the conductor as the conductor moves past the first sensor unit to provide a signal to start measurement of the conductor with the ranging sensor;
    measuring, with the ranging sensor using optical radiation, distances between the ranging sensor and different measuring points of the surface of the conductor while the conductor moves in relation to the ranging sensor arrangement;
    detecting, with the second sensor unit, the conductor as the conductor moves past the second sensor unit to provide a signal to stop measurement of the conductor with the ranging sensor;
    generating, with a signal processing unit, conductor surface profile data of the conductor on the basis of the measured distances between the ranging sensor and the different measuring points of the surface of the conductor;
    using the conductor surface profile data for determining at least one of the following properties: a dimension of the conductor and a shape of the conductor;
    mounting a crimp connector to an end of the conductor to form the crimp connection including the conductor;
    moving, with the moving mechanism, the crimp connection relative to the ranging sensor arrangement;
    detecting, with the first sensor unit, the conductor and the connector forming the crimp connection as the crimp connection moves past the first sensor unit to provide a signal to start measurement of the crimp connection with the ranging sensor;

measuring, with the ranging sensor using optical radiation, distances between the ranging sensor arrangement and different measuring points of the surface of the crimp connection while the crimp connection moves in relation to the ranging sensor arrangement;

detecting, with the second sensor unit, the conductor of the crimp connection as the crimp connection moves past the second sensor unit to provide a signal to stop the measurement of the crimp connection with the ranging sensor;

generating, with the signal processing unit, connection surface profile data of the crimp connection on the basis of the measured distances between the ranging sensor arrangement and the different measuring points of the surface of the crimp connection; and using the connection surface profile data for determining at least one of the following properties: a dimension of the crimp connection and a shape of the crimp connection.

11. The measuring method as claimed in claim 10, wherein the step of moving the crimp connection is further defined as rotating the crimp connection in relation to the ranging sensor arrangement with a center of rotation located inside the crimp connection.

12. The measuring method as claimed in claim 10, wherein the step of moving the crimp connection is further defined as rotating the crimp connection in relation to the ranging sensor arrangement with a center of rotation located outside the crimp connection.

* * * * *